United States Patent [19]

Olsen et al.

[11] 4,149,422
[45] Apr. 17, 1979

[54] VIBRATORY-WIRE PRESSURE SENSOR

[75] Inventors: Everett O. Olsen, Wrentham; Howard W. Nudd, Jr., Foxboro, both of Mass.

[73] Assignee: The Foxboro Company, Foxboro, Mass.

[21] Appl. No.: 732,130

[22] Filed: Oct. 13, 1976

[51] Int. Cl.² .................. G01L 1/10; G01L 13/06
[52] U.S. Cl. ............................. 73/704; 73/DIG. 1
[58] Field of Search ....... 73/DIG. 1, 517 AV, 407 R, 73/410, 398 R, 293, 704

[56] References Cited

U.S. PATENT DOCUMENTS

| | | | |
|---|---|---|---|
| 2,689,943 | 9/1954 | Rieber | 73/517 AV |
| 3,358,502 | 12/1967 | Johnson | 73/141 A |
| 3,393,565 | 7/1968 | Klee | 73/398 R |
| 3,701,392 | 10/1972 | Wirth et al. | 73/DIG. 1 |
| 3,771,346 | 11/1973 | Huslin, Jr. | 73/DIG. 1 |

FOREIGN PATENT DOCUMENTS

| | | | |
|---|---|---|---|
| 230713 | 9/1959 | Australia | 73/398 R |
| 1440341 | 4/1966 | France | 73/DIG. 1 |

*Primary Examiner*—Charles A. Ruehl
*Attorney, Agent, or Firm*—Parmelee, Johnson, Bollinger & Bramblett

[57] ABSTRACT

A pressure measuring instrument of the vibrating-wire type comprising an elongate base on which is pivotally mounted an elongate lever parallel to the base. A vibratory wire in the form of a very thin flat ribbon of tungsten is held tautly between the lever and the base. A pair of bellows are supported on the base, on opposite sides of the pivot mounted for the lever, and apply a torque to the lever proportional to differential pressure. Counterbalance means are provided to prevent errors with changes in spatial orientation of the instrument. The lever support-structure is formed of a composite of elements providing a match of temperature expansion characteristics with the vibratory wire. An overrange protection mechanism prevents the application of excessive force to the wire.

15 Claims, 7 Drawing Figures

VIBRATORY-WIRE PRESSURE SENSOR

BACKGROUND OF THE INVENTION

1. Field of the Invention

This invention relates generally to pressure measuring instruments for use in industrial process instrumentation systems. More particularly, this invention relates to pressure sensors of the type comprising a vibrating wire which is tensioned in proportion to the pressure being measured, and which vibrates at a frequency proportional to its tension.

2. Description of the Prior Art

It has been well known for many years that the vibratory frequency of a taut wire is a function of the tension in the wire. It was also early recognized that a pressure or force measuring instrument could be based on this relationship, by causing the wire to vibrate while tensioned with the unknown force applied thereto, and by detecting the frequency of vibration to produce a corresponding measurement signal. Considerable effort has been devoted to developing instruments in accordance with those principles.

In certain of the prior art instruments, the vibratory element was formed of magnetic material which was made to vibrate by applying thereto an alternating magnetic field as by means of a drive coil or the like; the vibratory movement of the element was detected by a pick-up coil. Such an approach also has been used with vibrating elements in the form of relatively stiff struts, as disclosed for example in U.S. Pat. No. 3,600,614.

In another approach to the problem, it has been proposed to position an electrically-conductive taut wire in a permanent magnetic field and to connect the ends of the wire to an electronic oscillator to develop an oscillating current in the wire so as to cause the wire to vibrate at its resonant frequency. The frequency of the oscillator represents the measurement signal. U.S. Pat. No. 2,455,021 and 3,543,585 show various arrangements of this sort.

In some instrument proposals, the vibrating wire was mounted within an enclosed chamber and one end of the wire was connected in tensioned state directly to a single pressure responsive diaphragm which was axially-aligned with the wire. Pressure applied to the diaphragm was transmitted through to the wire to vary the wire tension in accordance with the diaphragm pressure. One instrument of that character, known as the Vibrotron Gage, was placed on the market a number of years ago by a major instrument manufacturer, but that instrument does not presently appear to be available commercially. U.S. Pat. No. 3,543,585 shows a later proposed instrument of similar character, but wherein the vibrating wire was connected to an axially-aligned bellows rather than a diaphragm.

Notwithstanding the extensive development efforts represented by the considerable prior art in this field, the instruments which have resulted have not been satisfactory for many inportant applications. In particular, the prior art instruments generally have been incapable of sufficiently accurate operation, especially over long periods of time, and under adverse environmental conditions such as shock and vibration, and variations in ambient temperature.

SUMMARY OF THE INVENTION

The present invention overcomes the limitations and disadvantages of prior pressure transducers by providing a device of high accuracy and simple construction capable of withstanding the influence of numerous external factors. In a preferred embodiment of this invention, there is provided a pressure transducer which utilizes as the primary forcesensing element a very thin vibrating wire, advantageously in the form of a thin ribbon. The wire is positioned between the poles of a permanent magnet and is coupled to electronic oscillator circuitry which generates an alternating current passing through the wire. The current flowing through the wire reacts with the magnetic field causing the wire to move and thus produce a back EMF. Positive feedback at the oscillator circuitry sustains the vibration of the wire, and the tautness of the wire controls the oscillatory frequency.

The vibratory wire is stretched between an elongate rigid base and a lever pivotally mounted parallel to the base. A pair of bellows, which receive respective high and low input pressures, are positioned between the base and the lever, on opposite sides of the pivot, thereby allowing the lever to move in teterboard fashion about the pivot in response to the variations in differential input pressure received by the two bellows. The differential input pressure produces a force on the wire resulting in a corresponding frequency of vibration, which is then detected by electronic circuitry and converted to an electrical signal proportional to the force (and hence the differential pressure) applied to the wire. The overall arrangement provides very high accuracy of measurement, and especially affords substantial freedom from the effects of changes in positional orientation and of shock, vibration, and variations in ambient temperature. The instrument nonetheless is very simple in construction and economical to manufacture.

By using a wire formed as a very thin, flat elongate ribbon, rather than a round wire, certain non-linear distortion effects are minimized, thereby further enhancing the accuracy of the instrument.

Other objects, aspects and advantages of the present invention will in part be pointed out in, and in part apparent from, the following description considered with the accompanying drawings.

DESCRIPTION OF THE PREFERRED EMBODIMENT

Figure 1:
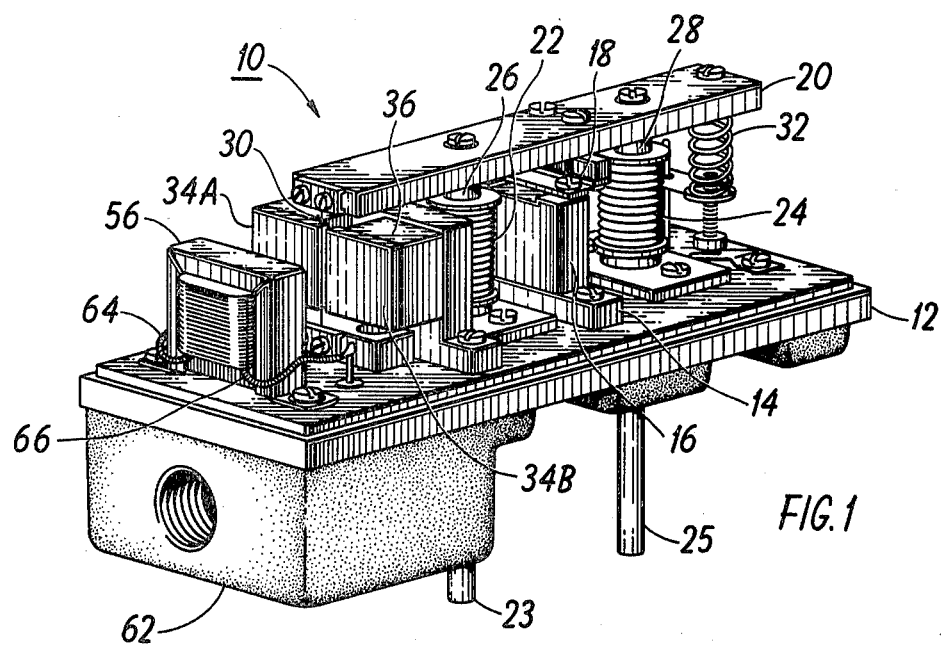
FIG. 1 is a perspective view of a pressure sensor embodying one form of the present invention.
Figure 2:
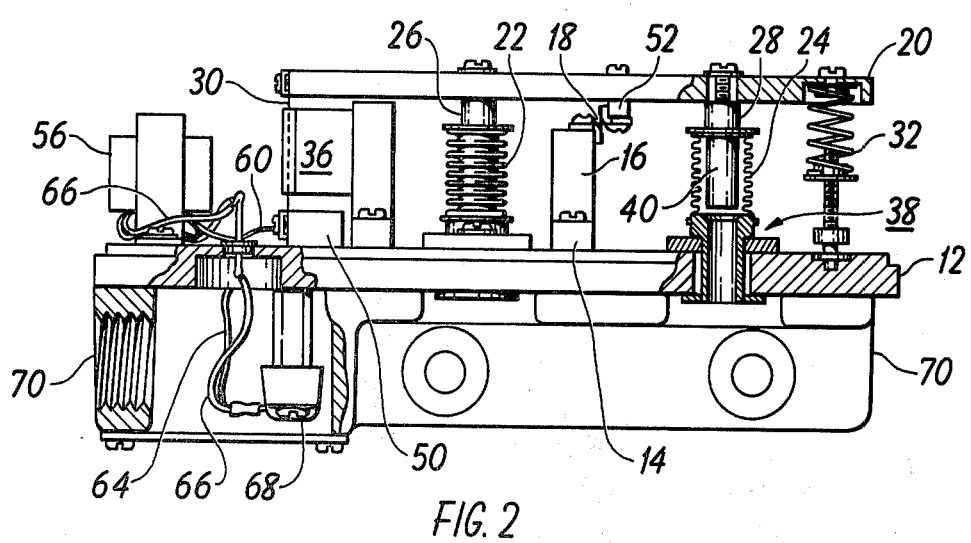
FIG. 2 is an elevation view, partly in section, of the sensor of FIG. 1.
Figure 3:
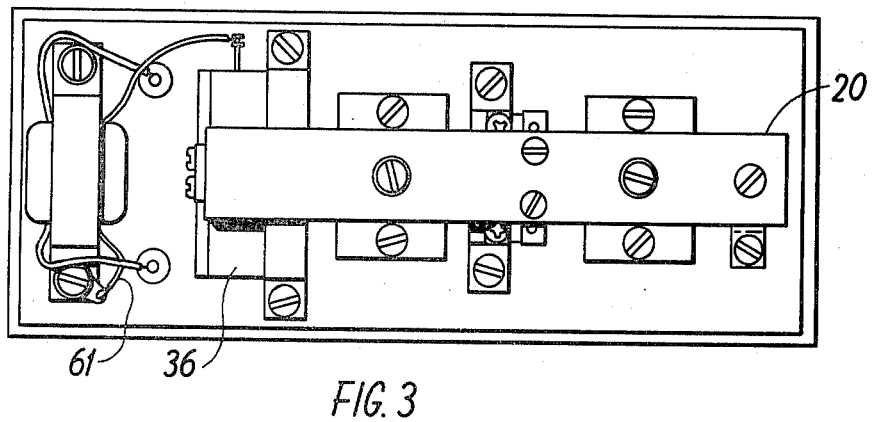
FIG. 3 is a plan view of the instrument shown in FIG. 1.

Referring now to FIGS. 1-3, the pressure sensor 10 is shown to comprise an elongate base 12 to which is secured, at about its longitudinal midpoint, a transverse bar 14 mounting an upright pivot post 16. At the upper end of this post is a cross-flexure 18 pivotally supporting an elongate balanceable beam in the form of a lever 20. The lever is pivoted approximately at its longitudinal center, and is oriented so that its longitudinal axis is effectively parallel to the longitudinal extent of the base.

On opposite sides of the pivot post 16 are respective high and low pressure bellows 22, 24 which are connected in conventional fashion to conduits 23, 25 (shown in FIG. 1) carrying input pressures the differential of which is to be measured. The upper movable ends of the bellows are rigidly connected through rods 26, 28 to the pivot lever 20 to apply corresponding forces upwardly against the underside of the lever.

Between the left-hand end of the lever 20 and the base 12 there is secured an electrically-conductive, vibratory taut wire 30 extending vertically between the lever and the base. This wire is positioned at a substantial distance from the pivot 18, so that the lever establishes a relatively large moment arm between the pivot and the wire. At the other end of the lever, a bias tension spring 32 is connected between the lever and the base, to apply a clockwise torque to the lever to maintain the wire at a zero-set tension when there is no differential in pressure between the two bellows 22, 24.

When a differential pressure is developed between the bellows 22, 24 a corresponding clockwise torque is applied to the lever 20 thereby increasing the tension in the wire 30 beyond the zero-set tension from the bias spring 32. As the differential pressure increases, the lever 20 will tend to rotate clockwise about the pivot axis 18 a slight amount, to the extent permitted by the degree of elasticity of the wire material. The cross-flexure pivot 18 restricts this rotational movement of the lever to the vertical plane, i.e. the plane which is parallel to the drawing sheet of FIG. 2.

In order to induce vibrations in the wire 30, it is subjected to a relatively uniform, strong transverse magnetic field between the pole pieces 34A, 34B of a permanent magnet 36 mounted on the base 12, and the ends of the wire are coupled, through means to be described, to an electronic oscillating circuit (not shown herein) which generates an oscillatory flow of current through the wire so as to cause it to vibrate laterally in its primary mode (i.e. wherein the only nodes are at the ends of the wire). The electronic circuitry for producing the oscillatory wire current does not form a part of this invention, and for further information on that aspect reference may be made to copending application Ser. No. 732,129, filed by E. Olsen et al. on Oct. 13, 1976.

The high and low pressure bellows 22, 24 have the same effective areas and are located at equal distances from the center line of the pivot 18, providing equal moment arms about that pivot. With both bellows exposed to the same pressure, minor adjustments can be made in the longitudinal location at which the low pressure bellows 24 exerts a force on the lever 20, in order to reduce to zero the net torque exerted by the two bellows on the lever. Such adjustment is accommodated by a screw-set bellows support 38 which can be released to permit manual shifting of the bellows to its proper position and then relocked.

By adjusting the bias spring 32, an appropriate tensioning force can be imposed on the wire 30 corresponding to zero or any arbitrary input differential pressure. The vibrational frequency associated with this tension, when translated into a transmitter output signal (conventionally a d-c signal of 4 milliamperes), represents the instrument zero-level signal.

Figure 5:
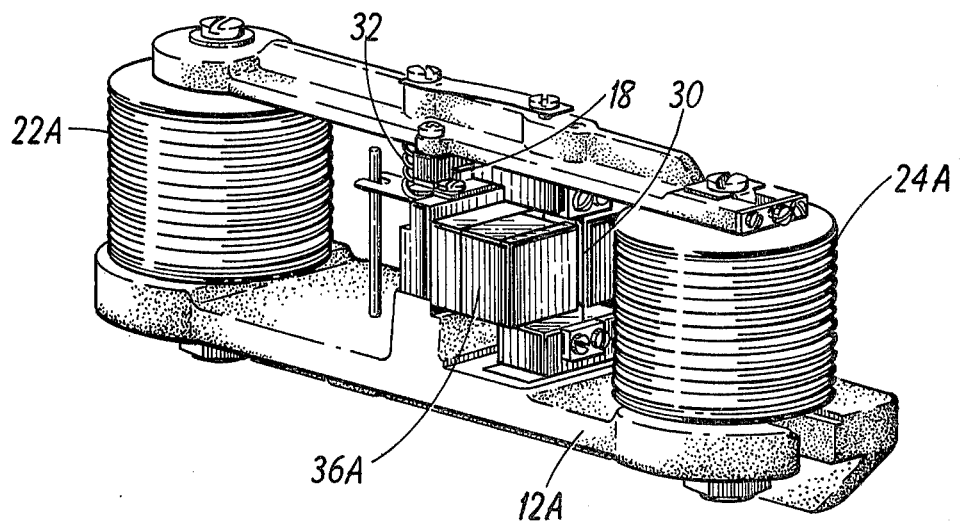
FIG. 5 is a perspective view of an alternate embodiment of a pressure sensor adapted for low pressure differential.
Figure 6:
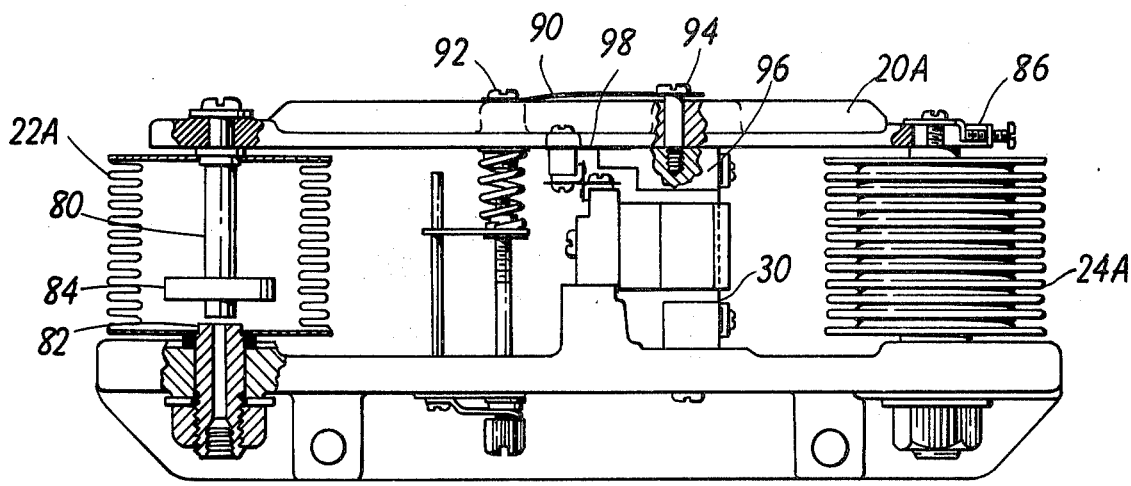
FIG. 6 is an elevation view, partly in section, of the sensor of FIG. 5.

The arrangement in FIGS 1-3 is suitable for measuring pressure differentials of the order of 30 psi. As an illustration of the considerable flexibility afforded by the unique design concepts of this invention, FIGS. 5 and 6 show another instrument in accordance with the invention, but adapted for much lower differential pressure measurements (e.g. of the order of one inch of water). In this alternative design, it particularly may be noted that, in contrast to FIG. 1, the bellows 22A, 24A are located outboard of the bias spring 32 and the vibrating wire 30, and have moment arms considerably larger than the moment arm of the wire with respect to the pivot axis 18. Nevertheless, it will be seen that the essentially balanced configuration of the basic instrument of FIG. 1 has been retained in the FIG. 5 embodiment.

The unique overall configuration of the instruments of FIGS. 1 and 5, wherein the force-producing bellows are offset laterally from the vibrating wire (i.e. offset in a direction perpendicular to the wire axis), and wherein these bellows are interconnected with the wire by a pivoted lever providing moment arms of selectable length for the wire and the bellows, is especially advantageous because it accommodates effective matching of the force-responsive characteristics of the wire and the force-producing characteristics of the pressure-responsive bellows, to achieve optimum transducer operation. Moreover, the balanced arrangement of multiple elements applying parallel forces to a centrally pivoted lever, perpendicular to the longitudinal axis thereof (i.e. perpendicular to a line between the two bellows), permits achieving substantial freedom from changes in output signal when the orientation of the instrument changes with respect to gravity, whether the changes are intentional or occur as a result of environment disturbances such as variations in temperature of the structure supporting the instrument. Similarly, this balanced instrument configuration minimizes adverse effects from shock or vibration in any of the three mutually perpendicular planes. Thus the instrument is capable of high-level performance under a wide variety of conditions. In addition, the simple but ragged constructional arrangement helps to assure reliable operation for long periods of time.

The balance of the pivoted parts of the instrument for differential spatial orientations with respect to gravity is aided by the use of counterbalance weights which are located in the interior of the two bellows 22, 24. Only one counterbalance 40 is shown in FIG. 2, as an extension of the rod 28 into the low-pressure bellows 24. A similar counterbalance is incorporated in the interior of the other bellows 22. It will be seen that, if the instrument 10 were oriented with its longitudinal axis vertical (parallel to the force of gravity), the weight of the lever 20 would create an additional component of torque tending to rotate the lever about the pivot 18 and thus to alter the wire tension. However, the counterbalances within the two bellows oppose this added torque and help in maintaining an effective balance about the pivot for different orientations.

The counterbalances in the bellows 22, 24 also can serve as physical stops to prevent overtravel of the lever 20 in the event of overrange pressure conditions. In the instrument of FIG. 1, only the stop in the high pressure bellows 22 actually is needed since overtravel of the lever in the opposite direction is prevented by the restraint of the wire 30.

It commonly is stated that the relationship between the wire tension T and the wire vibratory frequency f can be expressed by the relatively simple equation $$T = Af^2$$

(where A is a proportionality constant) However, in a practical instrument, the relationship between wire tension and frequency does not precisely follow that relatively simple equation. Instead, distortion effects are introduced which make the T versus f relationship deviate in a rather complex fashion from that equation. These distortion effects pose a serious problem in achieving high accuracy of force measurement, especially when the force-sensor is to be used in an industrial process instrumentation system where it is important to provide measurement signals linearly related to an applied force (or to differential pressure as in the embodiment disclosed herein).

Figure 4:
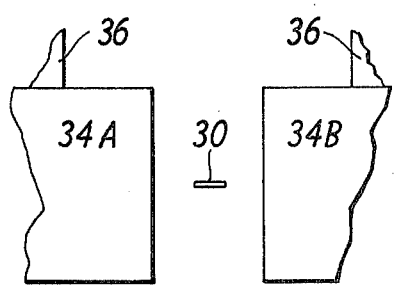
FIG. 4 is a detail horizontal section showing the vibrating ribbon adjacent the magnet pole pieces.

It has been found that these distortion effects are significantly minimized by making the vibratory wire as thin as possible. However, in designing a practical instrument, making the wire very thin creates still another problem, that of providing sufficient tensile strength in the wire to assure reliable operation, and freedom from wire breakage. In accordance with an important feature of the present invention, this problem has been resolved by providing the wire 30 in the form of a substantially flat ribbon (see FIG. 4), as thin as reasonably possible, with the width of the broad face of the ribbon dimensioned to provide a total cross-sectional wire area affording adequate tensile strength characteristics for the maximum force to be applied within the operating range of the instrument. The wire should be arranged so that it vibrates in its primary node (no nodes between the wire ends), in a direction perpendicular to the broad face of the wire ribbon. Additionally, in an instrument such as shown herein, the wire ribbon should be oriented so that its broad face is at right angles to the longitudinal axis of the lever 20. That is, the broad face of the wire ribbon will be perpendicular to the plane of rotational movement of the lever. As is apparent from FIG. 4, the magnetic field produced by the permanent magnet passes from one edge of the ribbon to the other.

In a preferred embodiment, the wire ribbon 30 was made of tungsten, with a short dimension (thickness) of about 0.001″ and a lateral (width) dimension of about 0.02″, providing an aspect ratio of about 20:1. Lower aspect ratios, i.e. down to about 10:1, will still give reasonably good results in minimizing distortion effects, but optimum instrument accuracy will be achieved with relatively high ratios.

It has been found advantageous to secure the ends of the wire 30 to vibration-absorbing masses of material, preferably relatively soft material such as aluminum. Thus, the lower end of the wire is fastened to an aluminum block 50, and the upper end is secured to the lever 20 which also is made of relatively massive aluminum, and equally serves as a vibration-absorbing material, just as block 50.

With the tungsten wire 30 stretched taut between two blocks of soft, vibration-absorbing aluminum, there will of course be a net change in length dimension with changes in temperature. This change however does not interfere with achieving accurate instrument performance because the construction of the instrument incorporates means in the supporting structure to match the length changes, so as to assure that the wire tension is not significantly affected by such temperature variations. To this end, the bar 14 is formed of stainless steel, having a predetermined temperature coefficient of expansion, and the pivot post 16 is formed of Invar, having a different temperature coefficient of expansion.

The pivot 18 is connected to the lever 20 by a small block 52 of aluminum. The ratios of the vertical dimensions of the steel bar 14, the post 16, and the aluminum block 52 are calculatedly predetermined to produce a net change in vertical length of the support structure, for a given change in temperature, equal to the change in overall length of the combination of the wire 30 and its aluminum block 50. With the ratios of these lengths properly set, the overall temperature-responsive change in length will be essentially matched to the net change in the effective wire length. Thus, there will be no significant change in tension in the wire 30 due to a change in temperature of the instrument.

The ends of the wire 30 are electrically connected to the primary of a transformer 56 mounted on the base 12, to provide for impedance-matched coupling of the wire to the wire-excitation electronic circuitry (nit shown herein). To effect one side of this electrical connection, a lead 60 is attached to the aluminum block 50 and connected at its other end to the transformer primary. The block 50 is electrically insulated from the base 12 by insulating material including a Mylar strip (not shown), so as to assure electrical isolation. The other side of the transformer primary connection is through the instrument "ground". That is, the primary winding is connected by a lead 61 to the instrument base, and this in turn provides the required electrical connection through the pivot 18 and the lever 20 to the top end of the wire 30, due to the conductive characteristics of the materials involved. One advantage of this arrangement is that there is no requirement of a wire connection to the top of the wire 30, which might interfere with the wire characteristics.

Beneath the base 12 is a junction box 62 into which a pair of wires 64, 66 extend from the secondary winding of the transformer 56. These wires are connected to stand-off connector 68 to which the electronic transmitter circuitry (referred to above) can be connected, through a conduit hole 70. The base 12 also is integral with a mounting flange 70 having suitable provisions for securing the instrument in place.

Referring now to FIGS. 5 and 6, the alternate embodiment of the invention, designed for very low pressure differentials, includes relatively large bellows 22A, 24A which are mounted at the ends of the pivoted lever 20A. Within these bellows are respective axial rods 80 (only one of which is shown), the lower ends of which are arranged to engage bellows support members 82, so as to prevent overtravel of the lever 20A due to overrange pressure conditions. These rods 80 also carry counterweights 84, in the form of relatively large discs, to provide for balancing the gravity forces due to the lever 20A, and other instrument elements associated therewith, in the event the instrument is tipped to an orientation different from the horizontal disposition shown in the drawings. A screw adjustment mechanism 86 is provided for the high-pressure bellows 24A, to provide for static alignment of the instrument at zero differential pressure.

Figure 7:
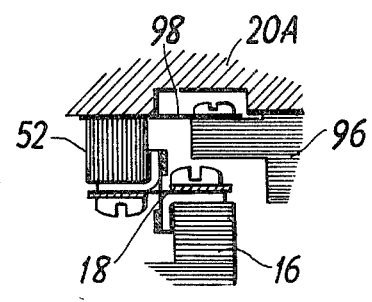
FIG. 7 is a detail vertical section showing the flexure arrangement for the sensor of FIG. 5.

In the FIG. 5 embodiment, it has been found advantageous to provide high pressure side overrange protection for the wire, particularly useful in the presence of high static pressures. The overrange protection mechanism includes a leaf spring 90 which is secured to the lever 20A by means of a screw 92. The other end of the leaf spring is maintained in the bending mode by a bolt 94 which has a smooth shank and extends with clearance through a hole through the lever. The end of the bolt is threadedly secured to a wire-support block 96 under the lever. This block is pivotally mounted at one end of a flexure 98 secured at its other end to the lever 20A (see also FIG. 7).

During normal operation of the instrument, the bending force exerted by the leaf spring 90 holds the wire-support block 96 against the underside of the lever 20A. Thus the force transmitted to the wire 30, by the lever, in effect is supported by the leaf spring. However, if the force applied to the wire begins to exceed the force developed by the leaf spring, the lever will rotate about the pivot 18 and lift up from the wire support block 96. This prevents the wire from receiving a force greater than that developed by the leaf spring. If the force continues to increase, the lever will rotate until the overtravel stop is engaged in the bellows 22A. When the input pressure decreases to normal operating ranges, the wire-support block and the lever will re-engage at exactly the same point as before, due to the guiding action of the flexure 98, thereby preventing any shift in the moment arm which might otherwise introduce an error in the measurement.

Although preferred embodiments of the invention have been described herein in detail, it is desired to emphasize that this is for the purpose of illustrating the principles of the invention, and should not necessarily be construed as limiting of the invention since it is apparent that those skilled in this art can make many modified arrangements of the invention without departing from the true scope thereof.

We claim:

1. A balanced pressure sensor of the vibrating-wire type comprising;
   an elongate base;
   an elongate lever extending in a direction parallel to the longitudinal axis of said base and spaced therefrom;
   pivot means mounted on said base and supporting said lever approximately at its longitudinal center for rotational movement in a plane containing the longitudinal axes of said base and said lever;
   magnet means mounted on said base in a position adjacent said lever, said magnet means having north and south pole pieces separated by an air-gap such that a strong, relatively uniform magnetic field is formed between said pole pieces;
   a thin, laterally-flexible wire connected between said base and said lever and passing through said air-gap;
   said wire being secured to said lever at a point of attachment which is displaced along said lever a predetermined distance in one direction away from said pivot means;
   bias spring means secured between said said lever and said base at a position which is displaced approximately said predetermined distance along said lever from said pivot means, on the side thereof which is opposite to said point of attachment, to apply a tensioning force to said wire; said wire being adapted to be coupled electrically to electronic circuitry to produce vibrations of the wire at a frequency related to the tensioning force;
   first and second bellows mounted on said base on opposite sides of said pivot means at least approximately equidistant therefrom and arranged to engage and apply to said lever corresponding forces in a direction which is at least approximately parallel to the longitudinal axis of said wire; each bellows being longitudinally displaced along said lever from the positions both of said wire and of said spring means and adapted to receive a pressure input signal;
   said bellows serving to develop a torque on said lever corresponding to an applied differential between the pressures in said bellows, thereby to control the wire tension accordingly.

2. In a force-sensor for use with process instrumentation wherein the tension of a vibrating member varies with changes in applied force; said force-sensor including;
   pressure-responsive means operatively coupled to said vibrating member over a pre-established operating range and adapted to receive pressure input signals and to translate said pressure input signals to corresponding forces applied to said vibrating member to produce a change in the tension thereof;
   overrange protection means for said vibrating member for assuring proper operation in the event that said applied forces exceed said pre-established range, comprising, in combination:
   means for rigidly supporting one end of said vibrating member;
   a lever coupled to said pressure-responsive means;
   pivot means supporting said lever;
   a block adjacent said lever and coupled to the other end of said vibrating member for applying forces to said member in accordance with pressure input signals applied to said lever;
   preloading means acting on said block and urging said block against said lever such that they remain substantially contiguous over said pre-established range for maintaining said pressure-responsive means operatively coupled to said vibrating member over said pre-established range;
   and
   said preloading means including means operable to decouple said block from said lever when said applied forces exceed said pre-established range whereby any further changes in said applied forces do not produce further changes in tension in said vibrating member.

3. Apparatus as claimed in claim 2, including second pivot means fastened between said block and said lever, said second pivot means being substantially stiff and constrained from all rotational and translational movement except about an axis parallel to the axis of said first pivot means;
   said second pivot means being operative with respect to said first pivot means to decouple said vibrating member from said lever only when said applied forces exceed the force exerted by said preloading means.

4. Apparatus as claimed in claim 3, wherein said second pivot means is a flexure.

5. Apparatus as claimed in claim 2, wherein said preloading means comprises a leaf spring, one end of said spring being secured to said lever and maintained in a bending mode;
   means for securing the other end of said leaf spring to said block such that the bending force exerted by said spring urges said block against said lever in the absence of any other forces.

6. A pressure sensor of the vibrating-wire type comprising:

a base;

a lever pivotally mounted with respect to said base and spaced therefrom;

a thin wire secured at one end to said base and at its other end to said lever at a position thereof offset from the pivot mounting of said lever to establish a first moment arm of predetermined length between said pivot mounting and the point of effective connection of said wire to said lever;

means producing a magnetic field through said wire whereby said wire can be vibrated by electronic circuitry at a frequency proportional to the tension in the wire;

a pressure-responsive element fixedly secured with respect to said base and arranged to apply a force to said lever at a position thereon which is displaced along said lever away from said point of wire connection and also displaced along said lever from the position of said pivot mounting to establish, between said pivot mounting and the position of the application of force developed by said pressure-responsive element, a second moment arm of predetermined length providing a preselected relationship to the length of said first moment arm;

said pressure-responsive element transmitting a force transversely to said lever to produce a torque about said pivot mounting to control the tension of said wire;

the vibratory frequency of said wire being in accordance with the ratio of magnitudes of said first and second moment arms and said ratio being selected to be a value providing an effective match of characteristics of said pressure-responsive element and said wire; and counterbalance means secured to said lever to provide for effectively constant balance of said lever about said pivot for different spatial orientations of said apparatus.

7. A pressure sensor of the vibrating-wire type comprising:

a base;

a lever pivotally mounted with respect to said base and spaced therefrom;

a thin wire secured at one end to said base and at its other end to said lever at a position thereof offset from the pivot mounting of said lever to establish a first moment arm of predetermined length between said pivot mounting and the point of effective connection of said wire to said lever;

means producing a magnetic field through said wire whereby said wire can be vibrated by electronic circuitry at a frequency proportional to the tension in the wire;

a pressure-responsive element fixedly secured with respect to said base and arranged to apply a force to said lever at a position thereon which is displaced along said lever away from said point of wire connection and also displaced along said lever from the position of said pivot mounting to establish, between said pivot mounting and the position of the application of force developed by said pressure-responsive element, a second moment arm of predetermined length providing a preselected relationship to the length of said first moment arm;

said pressure-responsive element transmitting a force transversely to said lever to produce a torque about said pivot mounting to control the tension of said wire;

the vibratory frequency of said wire being in accordance with the ratio of magnitudes of said first and second moment arms and said ratio being selected to be a value providing an effective match of characteristics of said pressure-responsive element and said wire;

said lever comprising at the point of attachment to said wire a large mass of relatively-soft vibration-absorbing material; and a block of relatively-soft, vibration-absorbing material at said one end of said wire remote from said lever and to which said one wire end is attached.

8. A pressure sensor of the vibrating-wire type comprising:

a base;

a lever pivotally mounted with respect to said base and spaced therefrom;

a thin wire secured at one end to said base and at its other end to said lever at a position thereof offset from the pivot mounting of said lever to establish a first moment arm of predetermined length between said pivot mounting and the point of effective connection of said wire to said lever;

means producing a magnetic field through said wire whereby said wire can be vibrated by electronic circuitry at a frequency proportional to the tension in the wire;

a pressure-responsive element fixedly secured with respect to said base and arranged to apply a force to said lever at a position thereon which is displaced along said lever away from said point of wire connection and also displaced along said lever from the position of said pivot mounting to establish, between said pivot mounting and the position of the application of force developed by said pressure-responsive element, a second moment arm of predetermined length providing a preselected relationship to the length of said first moment arm;

said pressure-responsive element transmitting a force transversely to said lever to produce a torque about said pivot mounting to control the tension of said wire;

the vibratory frequency of said wire being in accordance with the ratio of magnitudes of said first and second moment arms and said ratio being selected to be a value providing an effective match of characteristics of said pressure-responsive element and said wire;

a block of electrically-conductive material securing said one wire end to said base and being electrically insulated therefrom;

said lever, said pivot mounting and said base being formed of electrically-conductive material;

first and second electrical leads to couple said wire to electronic circuitry for vibrational excitation of said wire;

one of said leads being connected to said block for connection therethrough to said one end of said wire;

the other of said leads being connected to said base for connection therethrough and through said pivot mounting and said lever to said other end of said wire.

9. A balanced pressure sensor of the vibrating-wire type comprising;

an elongate base;

an elongate lever extending in a direction parallel to the longitudinal axis of said base and spaced therefrom;

pivot means mounted on said base and supporting said lever approximately at its longitudinal center for rotational movement in a plane containing the longitudinal axes of said base and said lever;

magnet means mounted on said base in a position adjacent said lever, said magnet means having north and south pole pieces separated by an air-gap such that a strong, relatively uniform magnetic field is formed between said pole pieces;

a thin, laterally-flexible wire connected between said base and said lever and passing through said air-gap;

said wire being secured to said lever at a point of attachment which is displaced along said lever a predetermined distance in one direction away from said pivot means;

bias spring means secured between said lever and said base at a position which is displaced approximately said predetermined distance from said pivot means, on the side thereof which is opposite to said point of attachment, to apply a tensioning force to said wire; said wire being adapted to be coupled electrically to electronic circuitry to produce vibrations of the wire at a frequency related to the tensioning force;

first and second bellows mounted on said base on opposite sides of said pivot means at least approximately equidistant therefrom and arranged to engage and apply to said lever corresponding forces in a direction which is at least approximately parallel to the longitudinal axis of said wire; each bellows being longitudinally displaced along said lever from the positions both of said wire and of said spring means and adapted to receive a pressure input signal;

said bellows serving to develop a torque on said lever corresponding to an applied differential between the pressures in said bellows, thereby to control the wire tension accordingly; and counterbalance means in both of said bellows and secured to said lever to provide for balancing of said lever about said pivot in different orientations of said apparatus within the plane of rotational movement of said lever.

10. A force sensing instrument of the vibrating wire type, wherein an electrical current flows through the wire and reacts with a magnetic field to develop vibrations of the wire proportional to the wire tension; said instrument comprising:

a base member;

a vibratable-wire formed of electrically-conductive material;

means fastening one end of said wire to prevent movement thereof with respect to said base member;

movable force-applying means for said wire and serving to apply a force to the other end of said wire to develop in said wire a tension corresponding to a force to be measured;

electrically-conductive motion means having one part fixed with respect to said base member and a movable second part mounting said force-applying means to provide for movement of said force-applying means and said other wire end with respect to said base member as said applied force changes;

electrical insulation means isolating said one end of said wire from said motion means;

first and second signal leads for carrying said electrical current to flow through said wire;

means electrically connecting said first signal lead to said one end of said wire;

means electrically connecting said second signal lead to said motion means; and means including said motion means providing and electrically-conductive path from said second signal lead to said other end of said wire to establish a closed circuit for said current.

11. An instrument as claimed in claim 10, wherein said motion means comprises a thin flexible metal element rigidly secured in one section thereof to said base member, and having a second section coupled to said force-applying means to accommodate movement thereof with respect to said base member.

12. An instrument as claimed in claim 10, wherein said fastening means comprises a mass of electrically-conductive material to which said one wire end is attached; and said electrical insulation means comprising an insulator interposed between said mass of material and said base member;

said first signal lead being connected to said mass of material.

13. An instrument as claimed in claim 12, wherein said force-applying means comprises a second mass of electrically-conductive material to which said other wire end is connected.

14. An instrument as claimed in claim 13, wherein said first and second masses are formed of relatively-soft, vibration-absorbing material.

15. A force-sensing instrument of the vibrating-wire type, comprising:

a base member;

a vibratable wire;

means fastening one end of said wire to said base member and including a first mass of relatively-soft, vibration-absorbing material;

tension-developing means mounted on said base member and including attachment means secured to the other end of said wire to apply a force to that other wire end;

said attachment means comprising a second mass of relatively-soft, vibration-absorbing material; and means for inducing vibrations in said wire corresponding to the tension thereof.

* * * * *